United States Patent [19]

Zemlin

[11] Patent Number: 5,159,368
[45] Date of Patent: Oct. 27, 1992

[54] AUTOMATIC AND MANUAL PANORAMIC CAMERA MOUNT

[75] Inventor: Karl E. Zemlin, Greensboro, N.C.

[73] Assignee: Burle Technologies, Inc., Wilmington, Del.

[21] Appl. No.: 739,210

[22] Filed: Aug. 1, 1991

[51] Int. Cl.[5] .............................................. G03B 29/00
[52] U.S. Cl. ...................................... 354/81; 354/293; 358/108; 248/349
[58] Field of Search .......................... 354/81, 293, 94; 358/87, 108; 352/243; 248/349

[56] References Cited

U.S. PATENT DOCUMENTS

| | | | |
|---|---|---|---|
| 3,164,838 | 1/1965 | Heinrich | 352/243 X |
| 3,398,664 | 8/1968 | Bonatsos | 354/81 |
| 3,437,753 | 4/1969 | Stith | 352/243 X |
| 4,330,184 | 5/1982 | Fattore, Jr. et al. | 354/81 |
| 4,901,146 | 2/1990 | Struhs et al. | 358/87 X |
| 4,922,275 | 5/1990 | Hughes | 354/293 |

Primary Examiner—Michael L. Gellner
Assistant Examiner—Howard B. Blankenship
Attorney, Agent, or Firm—Martin Fruitman

[57] ABSTRACT

A motor driven panoramic mounting for cameras which provides an automatic pan range and the ability to pan over 360 degrees. Mechanical actuators on a fixed base act upon a turnstile on a shaft on the rotating table, with the turnstile shaft also rotating two cams that actuate three limit switches. One cam acts upon a single limit switch which determines the automatic range and reverses the table motion at the ends of the automatic range. The other cam acts on two end limit switches which stop the motion. The action of the turnstile and switches brings the table back to the preset automatic range regardless of where it is directed when it placed back in the automatic mode.

4 Claims, 5 Drawing Sheets

AUTOMATIC AND MANUAL PANORAMIC CAMERA MOUNT

SUMMARY OF THE INVENTION

This invention deals generally with television cameras and more specifically with a panoramic drive system for a surveillance camera.

Surveillance cameras are now quite common in daily life. They are used in stores, parking lots and in industrial locations and have largely replaced the traditional night watchman. One person with a multiple camera system can now protect much larger areas than were previously guarded by several watchmen.

One of the reasons for this increased efficiency is the use of automatic panoramic cameras. These cameras are designed to constantly pan back and forth across the monitored area, allowing the operator to view a much greater area than would be available from a stationary camera, regardless of how wide an angle the lens of a stationary camera can view. To furnish full protection, however, the operator must also be able to stop the camera's automatic panning movement if he believes something is suspicious, and he must also be able to manually control the camera direction, and even move the camera beyond its usual panning range. Without such override capability, securing an area with several cameras becomes extremely difficult, since it would require that the operator be viewing a particular monitor when it pans across a questionable area.

Furthermore, it is very desirable to have the cameras return automatically to their panning modes and to their specifically prescribed panning ranges when the operator returns the system to automatic operation, without the need for the operator to relocate a camera to the position it was in before he changed over to manual control.

The present invention is a panoramic drive for a camera which furnishes full 360 degree rotation for the camera support table and very simple set up of the reversing stops, thus furnishing the versatility which is required to make a closed circuit television security monitoring system both easy to use and more effective.

This is accomplished by the use of several mechanical actuators on the table base structure, with the actuators interacting with a shaft mounted turnstile located on the rotating camera table. The turnstile shaft also rotates two limit switch cams which operate three conventional limit switches to control the motor which moves the camera table. Thus, the motion imparted to the turnstile as the rotating camera table moves and causes the turnstile to hit the fixed actuators, turns the limit switch cams which activate the switches and control the motor action.

The mechanical actuators, which are usually referred to as limit stops, are conveniently set up with two of them determining the range of automatic panning operation of the camera table and a third limit stop, and possibly a fourth, determining the absolute limits of camera motion in the manual operation mode.

The turnstile is constructed with three simple straight gates and a fourth gate which is constructed with an additional piece at its end most remote from the turnstile shaft. Also mounted on the turnstile shaft and rotating with it are two cams upon which ride the actuators of conventional electrical limit switches. Such switches generally are constructed with flexible levers, and the actuator is a small wheel or low friction slider attached to one end of the lever, so that the lever can easily follow and respond to changes in the surface of a cam. The motion of the lever then activates the electrical switch function.

In the present invention, one of the two cams on the turnstile shaft operates a single switch which reverses the direction of the camera table motor. The other cam operates two switches which act as end limit switches to stop the motor at locations beyond which table motion is not desirable. Although the table itself has unlimited motion when the the electrical connections for power and signals involved with the camera are fed to the table by means of slip ring assemblies, it is sometimes undesirable for the table to rotate completely around and view inactive areas. Therefore, the end limits are typically set to force the operator to stop and reverse the direction of table motion rather than to continue past the practical limits of viewing.

Also, as a back up system to the electrical end limit switches, the gate of the turnstile with the additional end piece is designed to serve as a mechanical stop, so that a failure of the electrical limit system will still not cause excess rotation, because the table motion will be blocked mechanically.

In normal automatic panning operation, only the single automatic reversing switch operates. Thus, when either one of the reversing limit stops hits the middle gate of the three straight gates on the turnstile and turns the turnstile, the shaft and the automatic reversing switch cam are also turned, the automatic reversing switch actuator moves through a change of elevation on the cam, and the direction of rotation of the table motor is reversed. The automatic reversing switch used to accomplish this is a standard switch whose circuitry is well understood in the art of motor control.

When the camera table motion is operated manually, the automatic reversing switch is switched out of the circuit, and a manual control switch is inserted in its place to control the motor direction. Under this circumstance, it is the end limit switches which will operate if the camera table is rotated to the selected end limits. These end limits are determined by the location of the end limit stops which also hit and turn the turnstile.

The end limit switches are activated by the second cam, the end limit cam, on the turnstile shaft. This cam has a depression on it which can activate either of the two end limit electrical switches, so that, as one of the end limit stops hits one of the outermost straight gates of the turnstile, the end limit cam is rotated so as to activate one of the end limit switches and to stop movement in the direction which permitted the activation of that end limit switch. Motion in the other direction, which permits the table to be rotated away from that end limit, is not affected.

It is important to note that the turnstile and automatic reversing cam are constructed in a manner such that any motion of the automatic reversing cam beyond the automatic panning range maintains the automatic reversing switch in the condition which is appropriate to move the table and the turnstile back within the automatic panning range. Therefore, whenever the system is switched back to the automatic panning mode, regardless of the position which the camera table is in at the time of the changeover, the system will return to automatic panning within the previously set range. Unlike more conventional limit switch arrangements, it is impossible to improperly manually locate the rotating table between the wrong set of limit stops and thereby put it into a different, and erroneous, panning range.

The present invention therefore permits the use of conventional limit stops and conventional electrical limit switches, so that initial set up of the panning range is quite simple, but nevertheless permits the operator to take over control from the panning action, and to return the system to automatic panning with no concern that the automatic panning range will be incorrect.

DETAILED DESCRIPTION OF THE INVENTION

Figure 1:
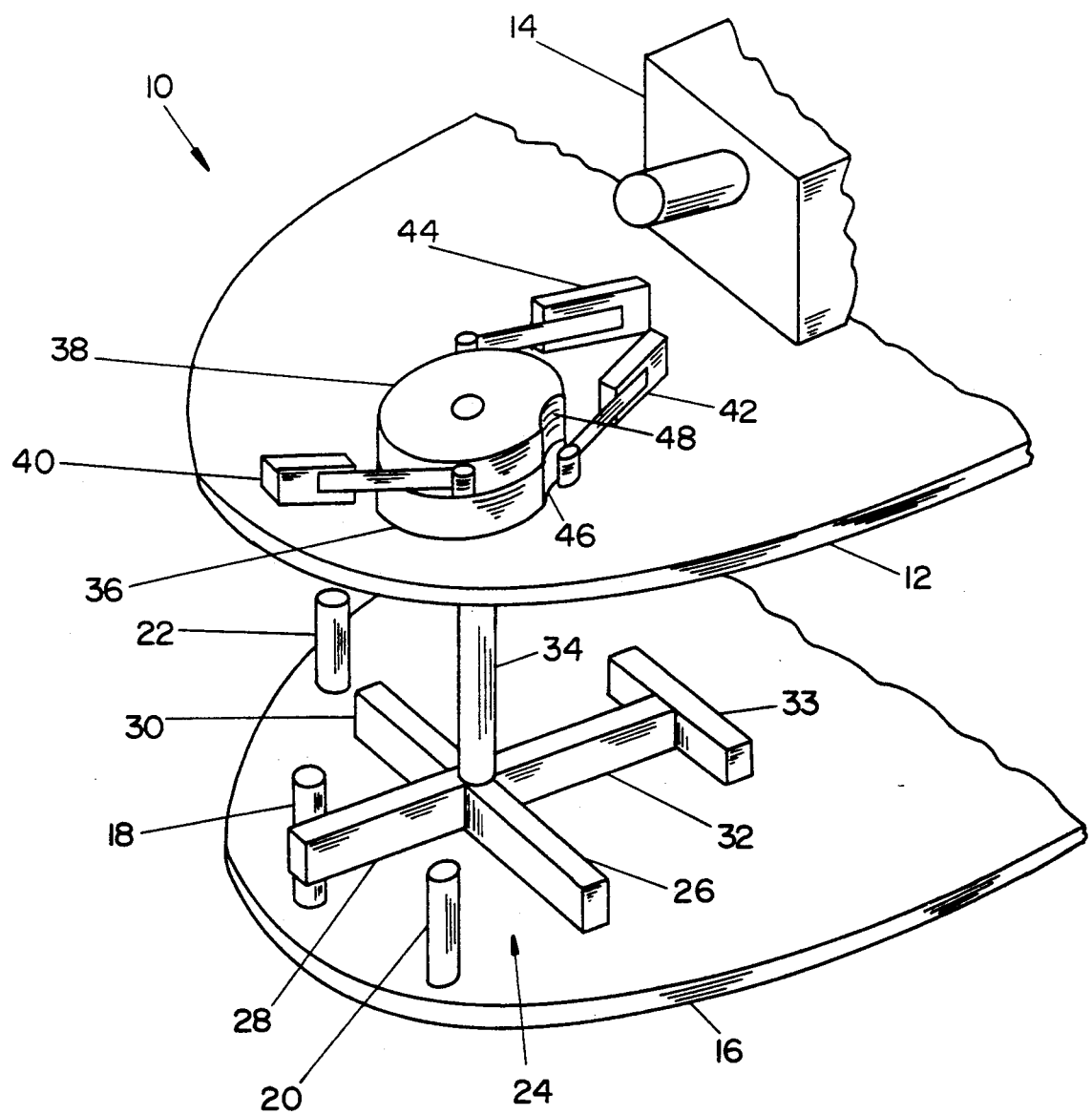
FIG. 1 is a perspective view of the preferred embodiment of the invention shown mounted on a rotating camera table.

FIG. 1 is a perspective view of the preferred embodiment of the invention in which panning control apparatus 10 is mounted upon rotating camera table 12 which supports camera 14, both of which are shown only partially. Camera table 12 is mounted upon a conventional shaft (not shown) and rotated in a plane above support base 16 by a conventional motor and gear arrangement (not shown).

Limit stops 18, 20 and 22 are mounted on support base 16 in locations so that they interact with and rotate turnstile 24 by being touched by gates 26, 28, 30 and 32, as camera table 12 rotates above base 16, and turnstile 24 moves past limit stops 18, 20 and 22. As turnstile 24 and shaft 34 rotate relative to table 12, they cause cams 36 and 38, which are also attached to shaft 34, to rotate and thereby affect limit switches 40, 42, and 44.

Limit switches 40, 42 and 44 are conventional style limit switches which change their electrical condition when their levers are deflected. Cams 36 and 38, against which the switch levers are mounted, include depressions 46 and 48, respectively, so that the rotation of the cams will change the switch conditions when the switch levers move into or out of cam depressions 46 and 48.

Figure 2:
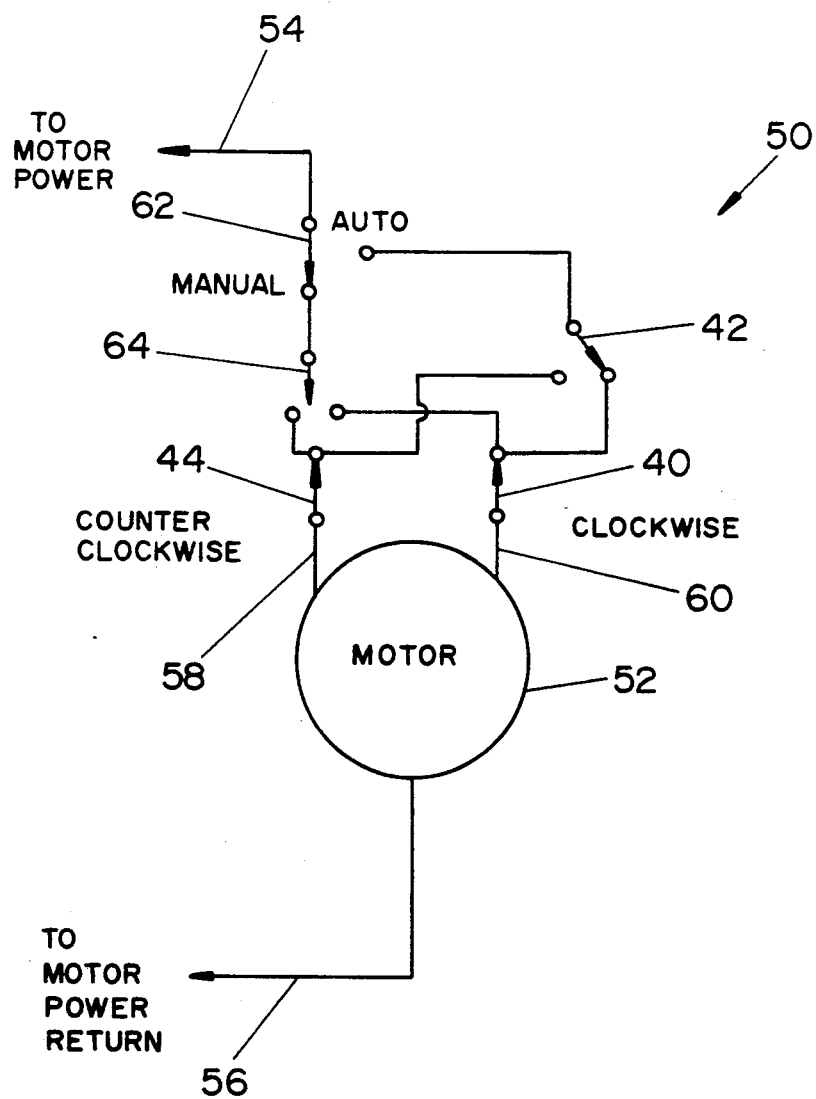
FIG. 2 is a simplified electrical schematic diagram of the motor control circuit of the invention.

FIG. 2 is a simplified electrical schematic diagram of control circuit 50 for table rotating motor 52. Control circuit 50 is a conventional arrangement and is included here in order that the operation of panning control apparatus 10 shown in FIG. 1 can be better understood.

In FIG. 2, motor 52 is powered from electrical lines 54 and 56, and the determination of the direction of the motor rotation is accomplished by applying the electrical power to one or the other of its feed lines 58 or 60. Thus, when manual-automatic switch 62 is set in its manual position as shown, power is fed through manual control switch 64, which may be operated to power either line 58 or 60, and thereby to move the camera table in one or the other direction. Regardless of which direction the table is moved, if it is moved too far in one direction, end limit switch 40 or 44 will eventually be operated (as described later in regard to FIG. 4) to interrupt the power which permits the motor to move in that direction, and the rotation will be stopped. However, regardless of which of the end limit switches has interrupted the power, the other switch is not affected and the motor can always be backed away from the end limit which has stopped it by rotating it in the other direction.

When manual-automatic switch 62 is set on its automatic position, electrical power is fed to automatic reversing switch 42, the mechanical operation of which will be described in regard to FIG. 3. However, the electrical operation of switch 42 is similar to that of manual switch 64 in that it supplies power to one or the other of motor feed lines 58 or 60.

Figure 3:
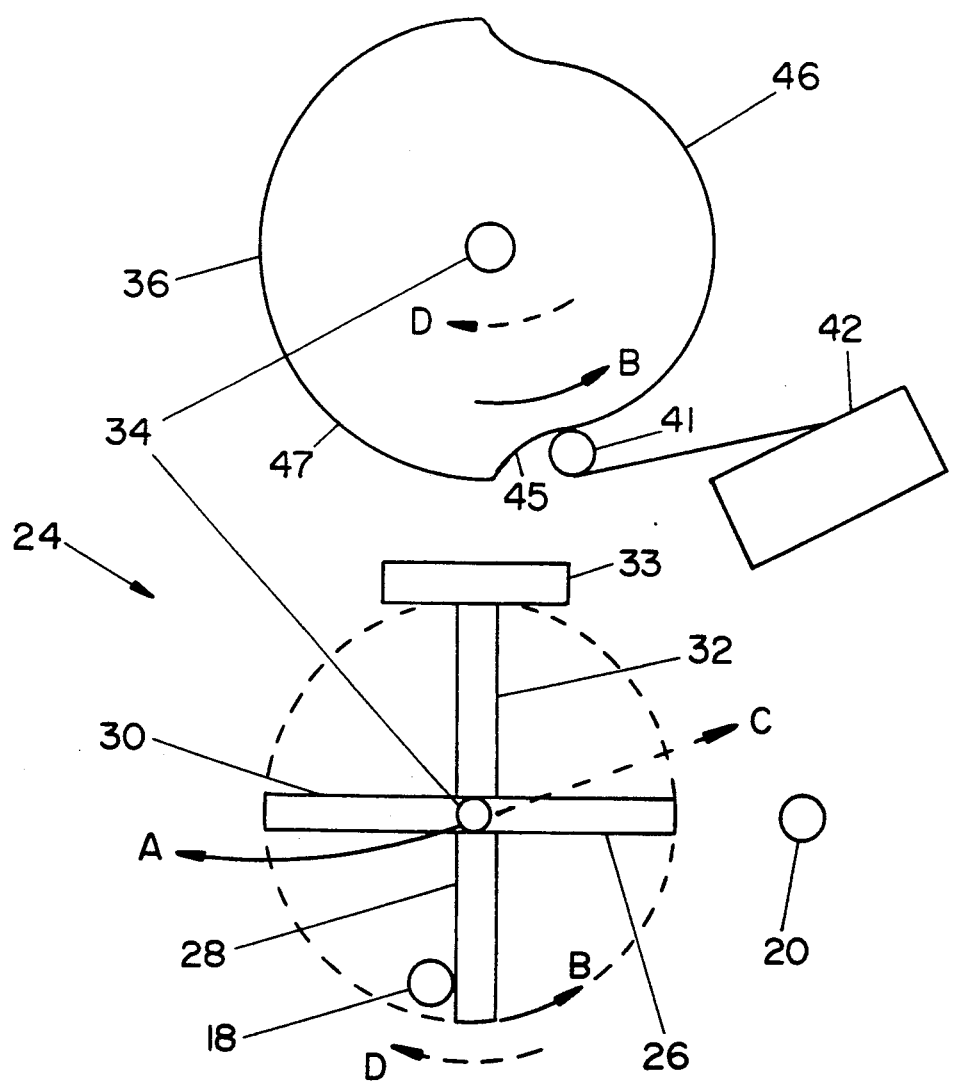
FIG. 3 is a simplified mechanical diagram showing the part of the preferred embodiment of the invention which controls the automatic panning mode.

FIG. 3 is a simplified mechanical diagram of the parts of the preferred embodiment of the invention which control the automatic panning operation of camera table 12. For clarity, turnstile 24 and cam 36, which are actually mounted on the same shaft 34, are shown separately so that their motion can easily be related. In studying FIGS. 3-5, it should be kept in mind that it is shaft 34 of turnstile 24 which is actually moving with table 12, upon which shaft 34 is mounted.

In the automatic operation mode of the invention, as turnstile shaft 34 is moved in direction A, turnstile gate 28 hits fixed limit stop 18, causing turnstile 24, shaft 34 and cam 36 all to rotate counterclockwise, in direction B. This rotation causes wiper 41 of switch 42, which is held fixed relative to cam 36, to move up slope 45 of cam depression 46 to high plateau 47, changing the status of switch 42. Since, as seen in FIG. 2, the rotation of motor 52 is reversed when the status of switch 42 changes, table 12, shaft 34, turnstile 24 and gate 28 then begin to move in direction C, away from limit stop 18 and toward limit stop 20. Turnstile 24 does not, however, rotate merely because of the translation of shaft 34, and the status of switch 42 does not change for the time being.

However, when turnstile gate 28 comes in contact with fixed limit stop 20, turnstile 34 is rotated in direction D, causing cam 36 to rotate in the same direction. This motion causes switch wiper 41 to move down slope 45, and it again changes the status of switch 42, causing the motor to reverse again and to begin moving table 12 in the original direction A, so that gate 28 will eventually hit limit stop 18 again and repeat the cycle. One advantage of the present invention is that the location of limit stops 18 and 20 are clearly and simply related to the ends of the automatic panning range, and that their location can therefore be set quite accurately even before the camera is operational.

Figure 4:
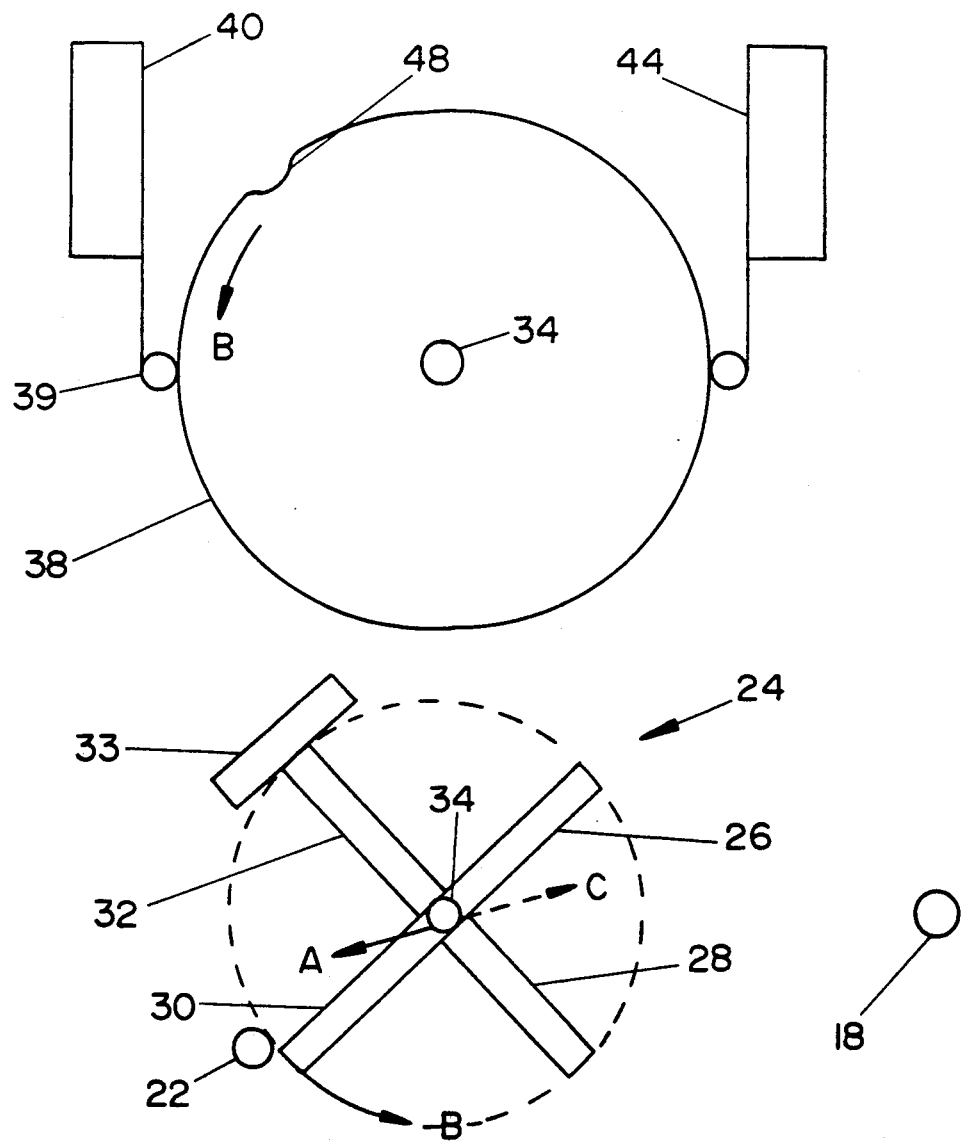
FIG. 4 is a simplified mechanical diagram of the invention showing the part of the invention which controls the limits of motor rotation in the manual operation mode.

FIG. 4 is a simplified mechanical diagram of the portions of the preferred embodiment of the invention which determine the motion of table 12 when the system is in the manual operation mode. For clarity, turnstile 24 and cam 38, which are both mounted on shaft 34, are shown separately. In FIG. 4, shaft 34 and turnstile 24 are shown in a location to which they have moved while progressing in direction A. Their location is beyond the region of limit stop 18, and is such that gate 30 is just contacting limit stop 22.

It should be appreciated that, as gate 28 had previously been pushed past limit stop 18, turnstile 24 was rotated in direction B, which caused gate 30 to be moved into a position so that it would contact limit stop 22. This rotation of turnstile 24, which is approximately 90 degrees, did not, however, change the status of switch 42, because wiper 41 of switch 42 continued to ride on high plateau 47 of cam 36 (see FIG. 3). Therefore, any time manual-automatic switch 62 is set to its automatic position, switch 42 will be in a condition which causes the table to move in direction C, toward limit stop 20, which is beyond limit stop 18, and to reestablish normal automatic panning.

When the system is in manual operation, the motion of table 12 is limited by limit switches 40 and 44, which are shown in FIG. 4. Thus, as shaft 34 and turnstile 24 move in direction A, and gate 30 is moved by limit stop 22 so that turnstile 24 and cam 38 rotate in direction B, depression 48 on cam 38 eventually moves opposite of and affects wiper 39 of switch 40. As wiper 39 moves into depression 48, switch 40 interrupts the power to rotate the motor in the direction in which it has been moving, and the rotation of table 12 stops.

Since the power to rotate the motor in the opposite direction has not been affected, the table can still be rotated in the other direction, in either the manual or the automatic modes.

Reestablishment of power to switch 40 requires more, however, than merely moving table 12 in the opposite direction, because turnstile 24 and cam 38 will only rotate and move wiper 39 out of depression 48 if turnstile 24 is contacted by another gate. That is the function of gate 32. As table 12 moves in direction C, limit stop 22 separates from gate 30 and approaches gate 32 which is eventually contacted and moved by limit stop 22, rotating cam 38, activating switch 40 and reestablishing power to move table 12 in direction A.

The limiting action of switch 44 is similar in the case of motion in direction C, opposite from direction A pictured in FIG. 4, and such limiting action can be made to occur either when turnstile gate 26 contacts limit stop 22 from the other direction, or when gate 26 contacts some other limit stop at a location intermediate between limit stops 20 and 22.

Figure 5:
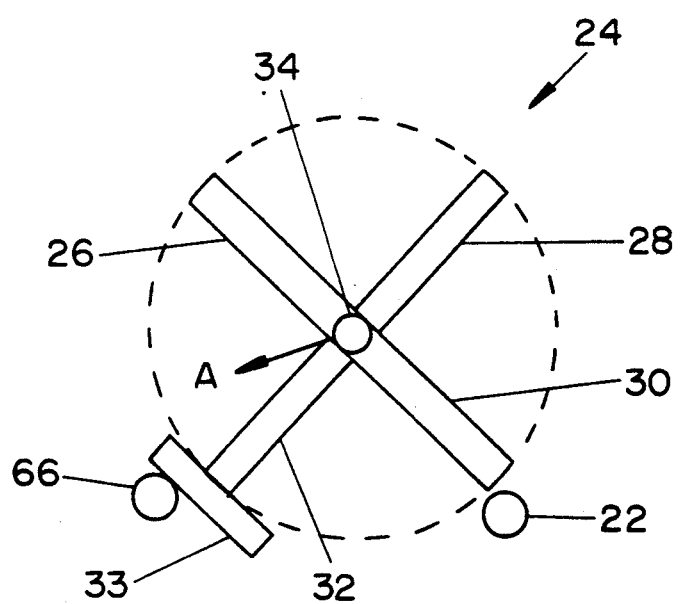
FIG. 5 is a simplified mechanical diagram of the mechanical stop feature of the invention.

FIG. 5 depicts another feature which can be added to the invention in order to furnish a mechanical stop which acts in addition to the action of electrical limit switches 40 and 44. FIG. 5 pictures turnstile 24 if, due to some malfunction of the electrical limit switch, or due to some separately imparted mechanical action, table 12 has been rotated in direction A so that turnstile 24 has passed beyond limit stop 22, rather than stopping as described in regard to FIG. 4.

Under such circumstances, gate 30 has been rotated by limit stop 22 so that gate 32 is located in a position to hit mechanical stop 66. Moreover, gate 32 has attached to it transverse end section 33 which prevents mechanical stop 66 from turning gate 32, and, instead, traps mechanical stop 66 against gate 32, causing turnstile 24, shaft 34 and table 12 to be prevented from moving, even if motor action continues.

The panning control system of the invention therefore not only furnishes both automatic and manual modes of operation, but also assures that when placed in the automatic panning mode, it will always operate over the prescribed range, and it also furnishes an additional mechanical safety stop to prevent accidental operation beyond the limits of the system.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters patent of the United States are desired to be secured is:

1. A camera panning control apparatus comprising;
   a base means;
   a rotatable table to which a camera can be attached, the table located in a plane essentially parallel to the base means;
   an electrical motor mechanically coupled to and rotating the table;
   at least first, second and third limit stops attached to and protruding from the base means;
   a shaft attached to the table and rotatable relative to the table;
   a turnstile constructed with at least first, second third and fourth gates, the turnstile being attached to the shaft and being located so that each gate comes in contact with at least one of the limit stops as the table rotates;
   first and second cams mechanically coupled to the shaft and rotating in synchronism with the turnstile, each of the cams having both plateau and depression regions;
   an electrical reversing switch connected to the motor so that the motor reverses its direction of rotation when the reversing switch changes its condition, the reversing switch located in a fixed position relative to the first cam having an actuator in contact with the first cam, and oriented so that the reversing switch changes its condition when the first cam rotates and the reversing switch actuator moves between a plateau and a depression on the first cam; and
   electrical first and second end limit switches connected to the motor so electrical power to move the motor in one direction is interrupted by the first end limit switch when it changes condition, and electrical power to move the motor in the other direction is interrupted by the second end limit switch when it changes condition, each end limit switch being located in a fixed position relative to the second cam, having an actuator in contact with the second cam, and being oriented so that it changes its condition when the second cam rotates and the switch actuator moves between a plateau and a depression on the second cam.

2. The camera panning control apparatus of claim 1 further including an end section on one of the gates on the turnstile, the end section acting so that, when the gate on which it is included contacts a limit stop attached to the base means, the end section traps the limit stop and prevents further movement of both the turnstile and the table in the direction which caused the contact between the limit stop and the gate.

3. The camera panning control apparatus of claim 1 further including a manual-automatic switch to disconnect the reversing limit switch from the motor and connect a manual direction control switch to the motor.

4. A camera panning control apparatus comprising;
   a base means;
   a rotatable table to which a camera can be attached, the table located in a plane essentially parallel to the base means;
   an electrical motor mechanically coupled to and rotating the table;
   at least first and second limit stops attached to and protruding from the base means;

a shaft attached to the table and rotatable relative to the table;

a turnstile constructed with at least one gate, the turnstile being attached to the shaft and being located so that the gate comes in contact with the limit stops as the table rotates;

a cam mechanically coupled to the shaft and rotating in synchronism with the turnstile, the cam having both plateau and depression regions; and an electrical reversing switch connected to the motor so that the motor reverses its direction of rotation when the reversing switch changes its condition, the reversing switch located in a fixed position relative to the cam, having an actuator in contact with the cam, and oriented so that the reversing switch changes its condition when the cam rotates and the reversing switch actuator moves between a plateau and a depression on the cam.

* * * * *